Oct. 11, 1966  B. C. BENDICSEN  3,278,767
CYCLIC CONTROL CIRCUITRY
Filed March 19, 1963  4 Sheets-Sheet 1
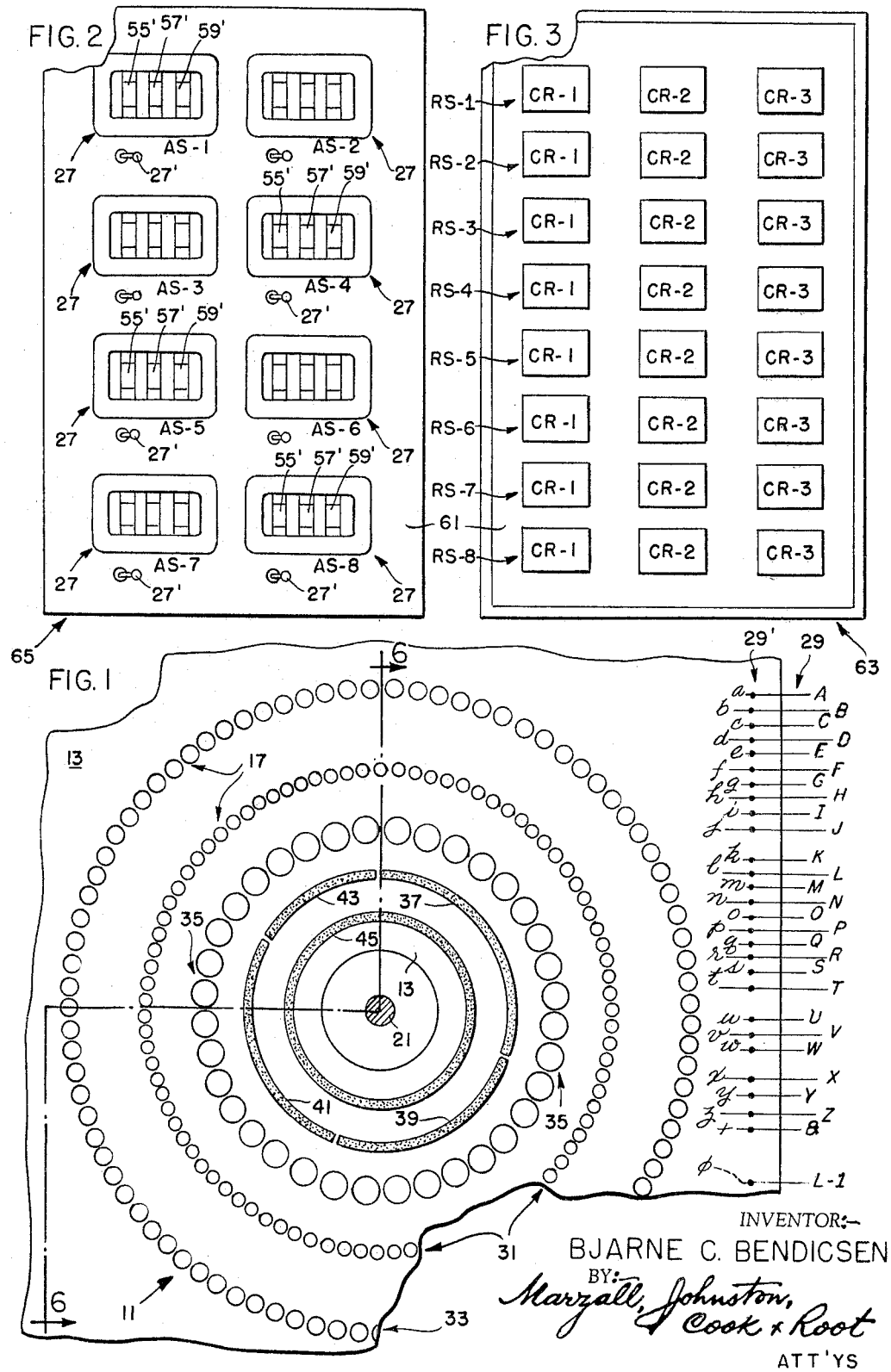
INVENTOR:-
BJARNE C. BENDICSEN
BY:
Marzall, Johnston, Cook & Root
ATT'YS

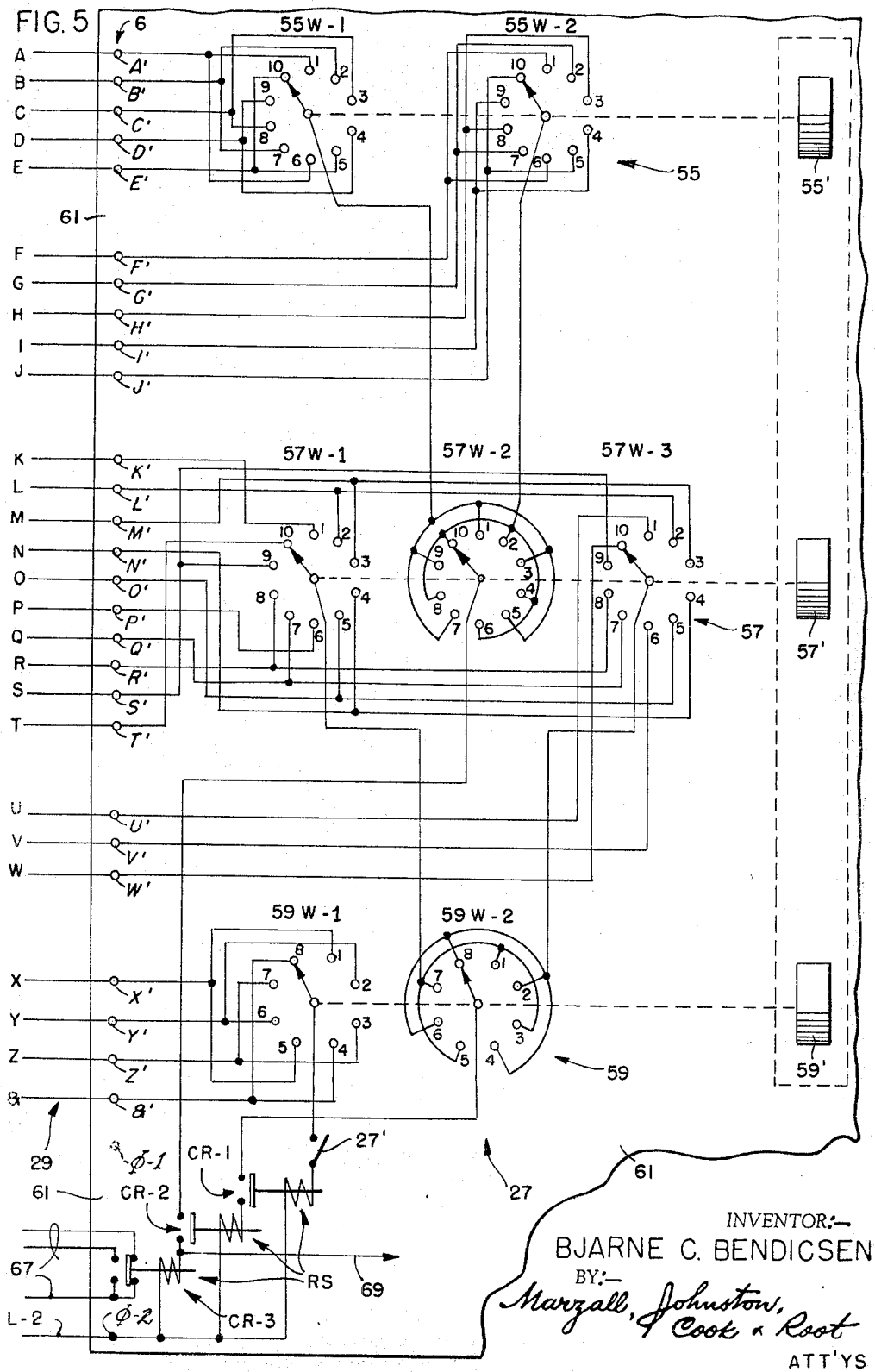

Oct. 11, 1966    B. C. BENDICSEN    3,278,767
CYCLIC CONTROL CIRCUITRY
Filed March 19, 1963    4 Sheets-Sheet 4

INVENTOR:—
BJARNE C. BENDICSEN
BY:
Marzall, Johnston,
Cook & Root
ATT'YS

United States Patent Office 3,278,767
Patented Oct. 11, 1966

3,278,767
CYCLIC CONTROL CIRCUITRY
Bjarne C. Bendicsen, Glen Ellyn, Ill., assignor to U.S. Industries, Inc., New York, N.Y., a corporation of Delaware
Filed Mar. 19, 1963, Ser. No. 266,406
10 Claims. (Cl. 307—141)

The present invention relates in general to electrical switching systems, and has more particular reference to a selectively adjustable system for causing the operation of relay switching means at any selected moment or moments during the performance of the complete operating cycle of any cyclically operable device, apparatus or mechanism with which the system may be associated, the invention pertaining more especially to an arrangement providing a multitude of switch actuating elements adapted to function successively during the performance of an operating cycle, whereby to cause operation of circuit cnotrolling relay switches in response to the actuation of the selected elements during the cycle, a feature of the invention being to provide a switching system that is useful in accomplishing automation in connection with the operation of apparatus used in performing cyclically repetitive processes.

An important object of the present invention is to provide cyclically operating monitor switching means forming a feedback device operable to deliver signals back to a command station or stations, for the actuation of relay circuitry when the switching means, during its operating cycle, reaches a selected relay circuit actuating position or positions preselected by the adjustment of selector switch means at the command station; a further object being to provide cyclically operable rotary switching means embodying a turnable switch arm adapted to successively engage a multiplicity of circularly arranged monitoring elements, each capable of causing operation of a circuit controlling relay switch when the arm is disposed in contact therewith during a corresponding moment in the course of the monitoring cycle of the switching means; a still further object being to provide feedback circuitry whereby a relay switch or switches may be caused to operate at any desired moment or moments during the monitoring cycle of the rotary switch.

Another important object is to provide a rotary monitoring switch having an arm adapted to be driven in unison with any cyclically operable apparatus to be monitored, in order to control the operation of relay switches at selected intervals during the performance of the operating cycle of the monitored apparatus; a further object being to provide a rotary switch containing a multiplicity of closely spaced switching elements or contacts adapted to be successively engaged and released by the rotary switching arm, the angular spacement of each adjacent pair of elements being preferably equal and of small order to thus subdivide the switch circumferentially into a relatively large number of cycle monitoring contacts each capable of controlling a work function when the switch arm engages therewith.

Another object is to provide a rotary switch having a plurality of circularly arranged contact elements or buttons spaced apart by an angle of the order of two degrees or less.

It will be appreciated, of course, that an angle of the order of two degrees subtends an arc having length of the order of 0.2 inch, at a radius of about six inches, so that the spacement between the circularly arranged contacts of a rotary switch having a diameter of twelve inches will have to be appreciably less than 0.2 inch in order to allow the circular disposition of 180 terminal buttons each spaced apart from the next adjacent button by an angle of two degrees. In order to minimize the mechanical difficulties encountered in producing a rotary switch having a large number of closely spaced circle dividing contact buttons, and to provide a rotary switch of the character mentioned having minimal size, the present invention contemplates the employment of two or more circular rows of buttons, the buttons of each row being relatively offset angularly with respect to the buttons of the next adjacent row, in order to subdivide the rotary switch into a large number of segments by means of buttons disposed within a circle of minimal diameter.

Another important object is to provide button selecting means, operable at a command station remote from the rotary monitor switch, to select any one or more of its circularly spaced contact buttons for circuit controlling connection in operable relay circuits; a further object being to provide button selecting circuitry employing a minimal number of connection conductors between the remote button selecting means and the rotary monitor switch, the invention specifically contemplating an arrangement whereby but twenty-seven conductors are required to connect remotely located button selection means with a rotary switch having one hundred eighty circle dividing buttons having spacement of two angular degrees between adjacent buttons.

Briefly stated, the benefits of the present invention may be realized by means of apparatus embodying a rotary monitor switch containing a rotary arm and a multiplicity of circularly spaced circle dividing relay circuit control buttons, which, if desired, may be arranged in a pair of concentric circular rows, or in several rows, the buttons of each row being angularly offset with respect to the buttons of the others, so that the rotary switch arm may successively engage and release the buttons of the several rows. In the interests of minimal switch size and circuitry, the rotary switch may include auxiliary contact elements with which the circle dividing buttons may be electrically interconnected in groups, to facilitate button selection and isolation. Manually operable selector devices, preferably comprising rotary wafer switches, may be provided for electrical connection with the circle dividing buttons and with the auxiliary contact elements, to permit buttons, selected by appropriate adjustment of the rotary wafer switches, to be made effective to energize remotely located relay switches, when the selected buttons are engaged by the rotary switch arm during its rotary movement.

The manually operable selector switches may be located remotely from the rotary monitor switch, and each selector switch may form a command station operable to condition an associated relay circuit or circuits for operation when the arm of the rotary switch reaches a precise relative angular position during its rotation, each command station consisting preferably of three digit thumb wheel type rotary switches, wherein the first digit switch may be adjusted to select angles of zero, one hundred, two hundred and three hundred degrees; the second switch may be arranged to select any decimal multiple of angles between zero and one hundred degrees, inclusive, while the third switch may serve to select any angle comprising the multiple of two degrees, between zero and eight degrees, inclusive. Each selector switch thus may be preset to select any desired two degree angular position on the three hundred and sixty degree circumference of the monitor switch.

The rotary monitor switch may form a feedback device comprising one hundred eighty separate circle dividing contact buttons having angular separation of two degrees between each adjacent pair of buttons, and electrically connected together, in groups of eighteen, to ten connection conductors; thirty-six circularly spaced auxiliary button grouping contact elements having angular separation of ten degrees between each adjacent pair of elements, and electrically connected, in groups of four, two and one, to thirteen separate conductors; three contact segments, which each subtend successive arcs of one hundred degrees in the switch assembly, and a single segment which subtends an arc of sixty degrees in the assembly, the segments being circularly disposed in end abutting relation in the assembly, and each segment being connected with a corresponding conductor; and the switch may include a single endless power supply ring disposed in concentric relation with respect to the circular rows of buttons, contact elements and segments. Means may be provided for connecting the power supply ring with one side of a suitable electric power source, and a cable embodying twenty-seven conductors may be employed to connect the ten button conductors, the thirteen contact element conductors and the four segment conductors with the remotely located selector switches.

The arm of the rotary switch may be provided with five electrically interconnected, preferably carbon brushes for wiping contact with the two rows of contact buttons, the row of auxiliary contact elements, the segments and the power supply ring, to thereby connect the power source successively with the buttons, with the auxiliary elements and with the segments as the arm is rotated. The brushes thus may cause pulsations to be fed back to the command station or stations to provide for relay operation in external circuits operatively associated with the selector switch assembly, at the command station, so that said external relay circuits may be energized when the arm of the rotary feedback or monitor switch reaches the particular angular position selected at the command station, by adjustment of the selector switches, means being provided for connecting the return side of the relay operating circuits with the side of the power supply source other than that which is connected to the power supply ring of the rotary switch.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings:

FIG. 1 is a face view of a rotary switch forming a feedback station embodying the present invention;

FIG. 2 is a face view of a panel containing selector switches each forming a command station operable to select any of the circle dividing contact buttons of the rotary switch shown in FIG. 1 for connection in relay actuating circuits;

FIG. 3 is a front view of panel mounted relay switches used in conjunction with the selector switches shown in FIG. 2;

FIG. 5 is a wiring diagram showing the electrical circuitry for connecting each of the selector switches shown in FIG. 2 with its associated relays shown in FIG. 3;

Figure 7:
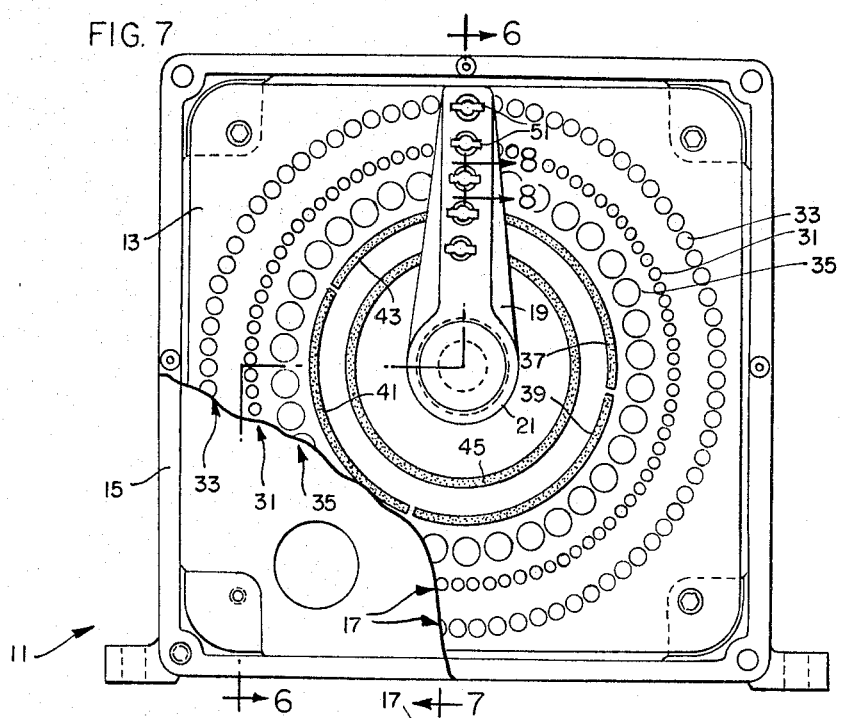
Figure 6:
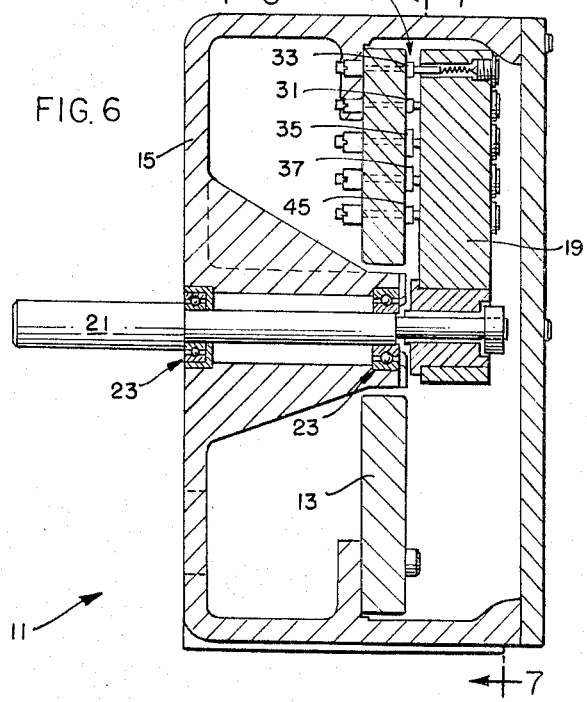
Figure 8:
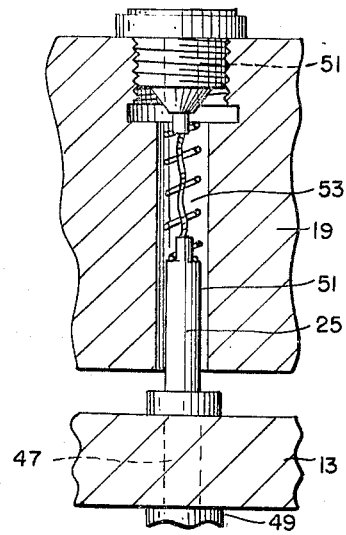

FIG. 6 is a sectional view taken substantially along the line 6—6 in FIGS. 1 and 7; and FIGS. 7 and 8 are sectional views respectively taken substantially along the line 7—7 in FIG. 6 and the line 8—8 in FIG. 7, the view comprising FIG. 8 being drawn to an enlarged scale.

To illustrate the invention, the drawings show an electrical switching system adapted for use in monitoring any cyclically operable device, mechanism or apparatus, in order to control the performance of such auxiliary or supplemental work or control functions as may be desired in conjunction with the operation of the cyclically operable device, such auxiliary control functions currently being designated by and included within the term "automation."

In attaining the automation of any operation or procedure, it is usually desirable, if not imperative, to monitor the principal operation in some convenient manner and to initiate the several auxiliary work and control functions, required for the performance of the automated procedure, at precisely timed moments during the cycle of operation of the monitored mechanism or apparatus. The electrical switching system of the present invention, accordingly, is adapted for operation in timed relation with respect to the monitored apparatus or procedure, and is adjustable to initiate one or more automated work or control functions at any selected moment during the cycle of operation of the monitored equipment with which it is used.

To these ends, the electrical switching system may comprise a rotary, circle dividing switch 11 embodying a support panel 13 mounted in a frame or base 15 and carrying a plurality of contact elements or buttons 17, spaced apart circumferentially in the mechanism, and a rotary switch arm 19 adapted to be driven in timed relation with the operating cycle of any cyclically operable apparatus with which the switch mechanism may be associated. The arm may be secured on a shaft 21 for turning movement therewith, the shaft being journaled in suitable bearings 23, mounted in the frame. The shaft is also formed for driving connection with apparatus to be monitored or with motive means driven in synchronism or timed relation with the aparatus to be monitored. The arm 19 is provided with preferably carbon brushes 25 adapted to make electrical contact with the buttons in succession, during each complete revolution of the arm. The several buttons 17 thus may form a corresponding number of signal feedback stations disposed in desired position on the panel 13, around the circumference of the switch, and adapted to be made effective for feedback purposes to actuate relay circuitry when the station defining button is contacted by the arm 19 during its rotation.

In the illustrated embodiment, one hundred eighty equally spaced button defined feedback stations are shown, each station being separated from the next by an angle of two degrees at the axis of rotation of the arm 19. It will be apparent, however, that the invention is not necessarily limited either to equal spacement between stations, nor to a station spacemen of two degrees; indeed, the invention contemplates station spacement of any desired angularity, or random spacement if required by circumstances.

The electrical system may also embody one or more command stations 27, each comprising contact selecting assemblies, of which eight are shown in FIG. 2 and identified respectively as assemblies AS–1 through AS–8. These contact selecting assemblies may be disposed in any desired location adjacent to or remote from the switch mechanism 11 and electrically connected therewith, as by means of conductors 29, which may conveniently comprise a cable extending between the monitor switch 11 and the remotely located command station or stations. As shown, the cable may comprise twenty-seven separate conductors, identified in the drawings by the twenty-six upper case alphabet characters and the ampersand symbol "&." As shown more particularly in FIG. 1 of the drawings, connection terminals 29' may be provided on the panel 13 of the monitor switch to facilitate the electrical connection of the cable conductors 29 with the contact buttons and segments of the switch, said terminals 29' being individually identified in the drawings by the twenty-six lower case alphabet characters and the plus symbol "+."

Each of the command station selector assemblies 27 has an associated off and on switch 27', which is preferably manually operable to condition the associated assembly for operation. Each selector assembly, also, is adapted for manual adjustment in order to select or isolate any desired one of the contact elements 17 of the switch mechanism, and to constitute the same as a feedback station to deliver a signal impulse for the actuation of a set of electrical relay switches RS associated with the selector assembly and which may be employed to perform any desired work or control function in response to the activation of the selected contact element as a feedback station, when the switch arm 19 electrically connects with it, there being eight sets of relay switches RS shown in FIG. 3 and identified respectively as switch sets RS–1 through RS–8, each set being operatively associated with a corresponding contact selecting assembly 27, and comprising, in the illustrated embodiment, three relay switches CR–1, CR–2 and CR–3. The switches CR–1 and CR–2 comprise normally open single-pole contactors and actuating coils which close the associated contactors when energized. The switch CR–3 comprises a single-pole double-throw structure forming a normally open and a normally closed contactor set, and an actuating coil operable, when energized, to close and open the normally open and closed contactors of the set.

Figure 4:
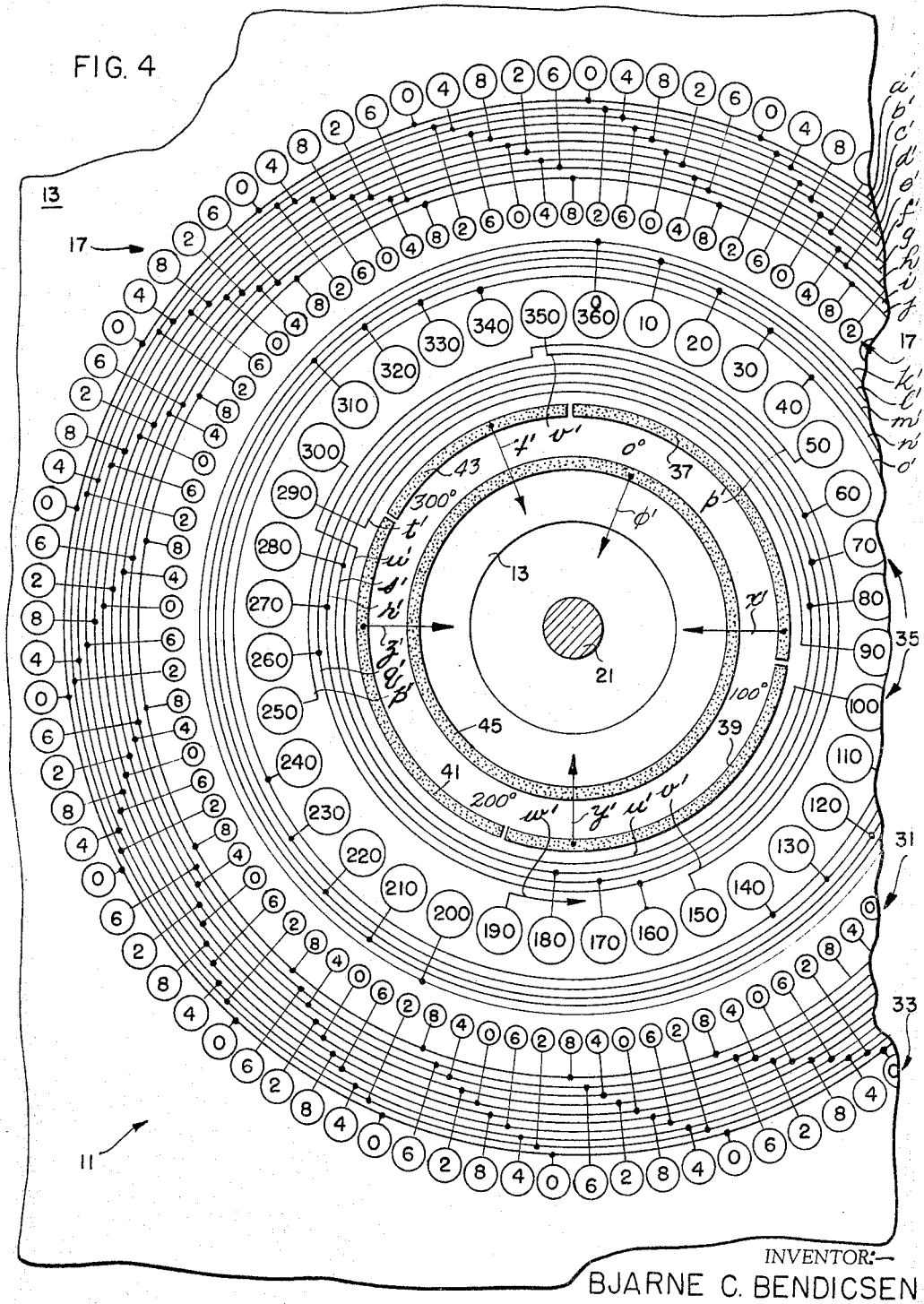
FIG. 4 is an enlarged view of the rotary circle dividing switch mechanism shown in FIG. 1 and illustrating the electrical circuitry of the switch.

In order to hold the size of the rotary switch mechanism 11 within reasonable limits while obtaining small angular spacement between adjacent circularly disposed contact buttons 17 of reasonable size, the same, as shown more particularly in FIGS. 1 and 4 of the drawings, may be arranged in two or more concentric rows on the panel 13, with the leading edges of the buttons of the several rows, that is to say, the edges which are first engaged by the arm 19 during its rotary movement, relatively staggered or offset in order to obtain the desired angular separation of the buttons as successively engaged by the arm. As shown, the buttons may be arranged as a pair of inner and outer concentric rows of buttons 31 and 33 each containing at equal number of buttons, although it will be obvious that the buttons may be arranged in more than two concentric rows, if desired, and that the concentric rows do not necessarily have to contai nan equal number of buttons. Indeed, it is entirely feasible and within the purview of the invention to include a larger number of buttons in an outer row so that the buttons of the inner row may be of larger diameter.

As shown, however, the inner and outer rows 31 and 33 contain an equal number of buttons, the inner row 31 comprising buttons of somewhat lesser diameter than those of the outer row, 33. The buttons are equally spaced apart in both rows, the button spacement in each row being four degrees of arc, since there are ninety buttons in each row; and the buttons of the inner row are circularly staggered or offset with respect to the buttons of the outer row, the offsetting being such that the button engaging brushes 25 on the arm 19 will alternately engage the successive buttons of the inner and outer rows as the arm traverses a rotary angle of two degrees between successive buttons during its rotary movement. Since the leading or button engaging edge of the brushes need not be disposed in precise radial alinement, but, as shown, may be relatively offset, the staggered or offset displacement of the buttons of the circular rows 31 and 33 may be likewise adjusted to accommodate any non-radial alinement of the button wiping brushes of the arm; but if the leading edges of the brushes are in radial alinement on the arm, then the offset displacement of the buttons in the rows 31 and 33 should be such as to present the leading edges of the buttons in position relatively offset to the angular extent required.

In order to minimize the number of conductors 29 required to interconnect the rotary switch with the selector stations 27, the rotary switch mechanism may be provided with thirty-six auxiliary contact buttons 35, mounted on the panel 13 and equally spaced about the axis of the switch, and preferably forming a single circular row of buttons disposed concentrically on the panel within the rows 31 and 33, the leading edge of each of said buttons 35 being circularly spaced with respect to the leading edge of the next adjacent button by an arcuate angle of ten degrees. As a consequence, each of the buttons 35 may subtend an arc embracing five adjacent circle dividing buttons 17, and hence may be employed in selecting or isolating the buttons 17 in successive groups comprising five adjacent buttons. Accordingly, by selecting any one of the buttons 35, the corresponding five circle dividing buttons 17 may be isolated.

In addition to the buttons 35, the switch mechanism 11 may include four arcuate contact segments 37, 39, 41 and 43, mounted on the panel 13 and arranged in end-to-end abutting relationship around the axis of the rotary switch, preferably concentrically within the row of buttons 35, the abutting ends of the segments being very slightly separated to permit them to be electrically insulated each from the others. The segments 37, 39 and 41 each subtend an angle of one hundred degrees about the axis of the switch mechanism, while the segment 43 subtends an angle of sixty degrees. Accordingly, each of the one hundred degree segments 37, 39 and 41 subtend angles including successive groups of ten of the buttons 35, while the sixty degree segment 43 subtends an arc embracing the remaining six contact buttons of the row.

As a consequence, the segments 37, 39, 41 and 43 may be employed to isolate and hence select corresponding groups of buttons 35. From a datum point representing zero degrees the segment 37 may serve to isolate the buttons 35 contacted by the arm 19 in moving from a cycle starting or zero position to a position displaced one hundred degrees from such starting position. The second segment 39 serves to isolate the buttons 35 which are successively contacted by the arm 19 during its movement from a position displaced one hundred degrees from starting position to a position displaced two hundred degrees from starting position. Similarly, the third segment 41 isolates the buttons 35 which are contacted by the arm 19 during its movement from a position displaced from starting position by two hundred degrees to a position displaced three hundred degrees from starting position, while the fourth segment 43 isolates the six buttons which are successively contacted by the arm 19 during the completion of its rotary movement from a position displaced from the starting position by an angle of three hundred degrees. The rotary switch mechanism may also include a continuous power supply contact ring 45 disposed concentrically within the ring of segments. The contact ring 45, the segments 37, 39, 41 and 43, and each of the buttons 17 and 35 may be provided with rearwardly extending anchoring and connection studs 47 extending in and through openings formed in the panel 13, said connection studs, on the side of the panel remote from the buttons 17 and 35 and the segment and ring, carrying connection means 49 for electrical connection with the bus conductors $a'$ through $z'$ and $+'$.

The apparatus is adapted to be energized for operation from a suitable source of electrical energy through a power supply line comprising conductors L–1 and L–2. Suitable means, such as a connection terminal $\phi$, on the panel 13, and a conductor $\phi'$ connecting the terminal with the ring 45, may be provided for electrically connecting the ring 45 with one side L–1 of the power supply line.

As shown in FIG. 7, the arm 19 may be provided with five electrically interconnected brushes 25 in position respectively to wipingly engage the buttons of the rows 31, 33 and 35, and the segment 37, 39, 41 and 43, as well as the power supply ring 45, as the arm 19 is rotated in the performance of its monitoring cycle. The brushes may be of rectangular sectional configuration and supported in correspondingly shaped slots 51 formed in the arm 19, with the long axis of the brush section extending tangentially with respect to its circular movement in the switch structure. If desired, each brush may have greater width than the next adjacent brush in a direction away from the rotary axis of the switch; and the leading edges of the brushes are preferably disposed in the arm in radial alinement with said rotary axis. Preferably, spring means 53 may be provided for yieldingly urging the brushes on the arm 19, in a direction to wipingly press the brushes upon the buttons 31, 33 and 35, upon the segments 37, 39, 41 and 43, and upon the ring. As a consequence, as the arm rotates, the buttons 17, the buttons 35, and the segments will be connected successively with one side of the power source, through the supply ring 45.

As shown in FIG. 4 of the drawings, the hundred degree segments 37, 39 and 41, and the sixty degree segment 43, are respectively connected with the terminals $x$, $y$, $z$ and $+$, as by means of conductors $x'$, $y'$, $z'$ and $+'$. The ten degree buttons 35 are electrically interconnected in groups of one, two and four, for connection with the terminals $k$ through $u$, by means of bus conductors $k'$ through $u'$, which are respectively connected with the corresponding terminals. To this end, the zero or 360° button, together with the 180° button, may be connected with the terminal $k$ by bus conductor $k'$. The ten degree buttons, that is to say, the 10°, 110°, 210° and 310° buttons, may be connected with the terminal $l$, by bus conductor $l'$. The twenty, thirty, forty, sixty, seventy and eighty degree buttons likewise may be connected respectively with the terminals $m$, $n$, $o$, $q$, $r$ and $s$ by corresponding bus conductors $m'$, $n'$, $o'$, $q'$, $r'$ and $s'$. The 50° and 250° buttons may be connected to the terminal $p$ by bus conductor $p'$, while the 150° and 350° buttons are connected with the terminal $v$ by bus conductor $v'$. The 90° and 290° buttons may be connected with the terminal $t$ by bus conductor $t'$, while the 190° button is connected by conductor $w'$ to the terminal $w$, the 100° and 300° buttons being connected with the terminal $u$ by bus conductor $u'$.

The two degree contact buttons 17 are electrically interconnected in groups for connection with the first ten cable connection terminals $a$ through $j$. To this end, the one hundred eighty contact buttons 17 may be interconnected, in ten groups containing eighteen buttons each, the buttons of the groups being connected to bus conductors $a'$ through $j'$ which, in turn, are electrically connected with the corresponding terminals $a$ through $j$. Starting from a zero or datum position, successive contact buttons, in groups of ten, may be respectively connected to the ten bus conductors, $a'$ through $j'$, so that eighteen contact buttons are connected with each bus conductor, the buttons so connected to any one conductor being angularly spaced twenty degrees apart, in the monitor switch. In short, the ten buttons 17 which subtend any twenty degree segment of the switch are respectively connected with the conductors $a'$ through $j'$.

Any desired or required number of command station selector switch assemblies 27 may be connected in parallel relation with the conductors 29 of the connection cable, eight assemblies being shown in FIG. 2. As shown in FIG. 5, each command station switch assembly 27 may comprise three selector switches 55, 57 and 59 respectively adjustable, as by means of manually operable wheels 55', 57' and 59', to select a desired group of the two degree buttons 17, to select a desired group of the ten degree buttons 35, and to select one of the four segments 37, 39, 41 and 43 for connection with the relay switches CR-1, CR-2 and CR-3 for the operation thereof.

The switches 55 and 57 may conveniently comprise wafer switches having ten switch positions defined by contact buttons numbered from one to ten, the switch 59 comprising wafers having eight switch positions defined by contact buttons numbered from one to eight. The switches 55 and 59 each embody two wafers respectively identified as wafers 55W-1 and 55W-2, of the switch 55, and wafers 59W-1 and 59W-2, of the switch 59, the switch 57 preferably comprising three wafers 57W-1, 57W-2 and 57W-3.

The selector and relay switches 27 and RS may be mounted upon a suitable support structure 61 which may comprise an open top box 63 in which the relays RS may be mounted, and a panel 65, which may form a preferably hinged cover for the box and a mounting for the selector switches 27. The support structure, also, may support a plurality of connection terminals respectively identified in the drawings by reference characters $A'$ through $Z'$ and $\&'$ and adapted respectively for attachment with the corresponding conductors $A$ through $Z$ and $\&$ of the connection cable. The diametrically opposite contact buttons 1-6, 2-7, 3-8, 4-9 and 5-10 of the switch wafers 55W-1 and 55W-2 are electrically interconnected and are also connected respectively with the terminals $A'$ through $J'$, whereby said interconnected buttons of the switch wafer 55W-1 may be connected through the conductors of the connection cable respectively with the two degree contact buttons 17 of the monitor switch that are connected with the bus conductors $a'$, $b'$, $c'$, $d'$ and $e'$, while said interconnected buttons of the switch 55W-2 may be connected through the conductors of the connection cable respectively with the two degree contact buttons of the monitor switch that are connected with the bus conductors $f'$, $g'$, $h'$, $i'$ and $j'$. The rotary switch arms of the wafers 55W-1 and 55W-2 are mechanically connected together and to the operating wheel 55' so that the arms will move in unison to simultaneously engage the correspondingly numbered contact buttons of both wafers.

The buttons of the switch wafers 57W-1 and 57W-3 are interconnected with the terminals $K'$ through $W'$ and hence through the conductors of the connection cable with the ten degree contact buttons 35 of the monitor switch, as indicated in the following chart:

| Wafers | Buttons | | Terminals |
|---|---|---|---|
| 1 | 1 | Connected to | K'. |
| 1 & 3 | 2 | do | L'. |
| 1 & 3 | 3 | do | M'. |
| 1 & 3 | 4 | do | N'. |
| 1 & 3 | 5 | do | O'. |
| 1 | 6 | do | P'. |
| 1 & 3 | 7 | do | Q'. |
| 1 & 3 | 8 | do | R'. |
| 1 & 3 | 9 | do | S'. |
| 1 | 10 | do | T'. |
| 3 | 1 | do | U'. |
| 3 | 6 | do | V'. |
| 3 | 10 | do | W'. |

The odd numbered buttons of the switch wafer 57W-2 are electrically connected together and to the rotary arm of the switch wafer 55W-1, while the even numbered buttons of said wafer 57W-2 are also electrically connected together and to the rotary arm of the switch wafer 55W-2. The rotary switch arms of the wafers 57W-1, 57W-2 and 57W-3 are mechanically connected together and to the operating wheel 57' so that the arms will move in unison to simultaneously engage the correspondingly numbered contact buttons of said wafers.

The diametrically opposite buttons 1-5, 2-6, 3-7 and 4-8 of the wafer switch 59W-1 are electrically interconnected and are also connected respectively with the terminals $X'$, $Y'$, $Z'$ and $\&'$, whereby said interconnected buttons may be connected through the conductors of the connection cable respectively with the segments 37, 39, 41 and 43 which are connected with the conductors $x'$, $y'$, $z'$ and $+'$. The odd numbered buttons of the switch wafer 59W-2 are electrically connected together and to the rotary arm of the switch wafer 57W-1, while the even numbered buttons of said wafer 59W-2 are also electrically connected together and to the rotary arm of the switch wafer 57W-3. The rotary switch arms of the wafers 59W-1 and 59W-2 are mechanically connected together and to the operating wheel 59' so that the arms will move in unison to simultaneously engage the correspondingly numbered contact buttons of such wafers.

The support structure 61 may be provided with a terminal φ–2 for connection with the conductor L–2 of the power supply line. The rotary switch arm of the wafer 59W–1 may be connected with the terminal φ–2 through the conditioning switch 27' and the actuating coil of the normally open relay switch CR–1. The rotary switch arm of the wafer 59W–2 may be connected with the terminal φ–2 through the normally open contactor of the relay CR–1 and the actuating coil of the relay switch CR–2. The rotary switch arm of the wafer 57W–2 may be connected with the terminal φ–2 through the normally open contactor of the relay switch CR–2 and the actuating coil of the relay CR–3.

The power supply conductor L–1 may be connected directly to the terminal φ on the support panel 13 of the monitor switch 11, as shown in FIG. 1. Alternately, the support structure 61, at the command station 27, may be provided with a terminal φ–1; and the cable 29 may include an extra conductor (not shown) for connecting the terminal φ (FIG. 1) with the terminal φ–1 (FIG. 5), thus permitting both of the power supply conductors L–1 and L–2 to be connected in the system at the adjacent terminals φ–1 and φ–2, at the command station 27. If desired, a similar arrangement may be used for connecting both power supply conductors in the system by means of a pair of connection terminals on the panel 13 of the monitor switch.

Conductor means 67, connected with the contacts of the relay CR–3, may be provided for connecting the same in external relay circuits containing operable devices to be energized from a suitable power source or sources, by operation of the relays RS, under the control of the monitor switch 11 as conditioned for service by the selector switch means 27. A conductor 69 may also be connected to the side of the actuating coil of the relay switch CR–3 remote from the terminal φ–2, to permit the said relay switch to be controlled, if desired, by other means than the selector switch assembly 27 with which it is associated, as, for example, by another or other associated selector switch assemblies.

So long as the conditioning switch 27' remains open, the associated selector switch means 27 remains inactive despite continuous rotation of the arm 19. The switch 27' being closed, however, the actuating coil of the relay CR–1 will become energized to close its associated contactor, as soon as the arm 19, during its rotation, shall have come into engagement with the segment 37, 39, 41 or 43 that has been selected by adjustment of the switch 59. Closure of the contactor of the relay CR–1 will permit the actuating coil of the relay CR–2 to become energized to close its associated contactor, as soon as the arm 19, during its rotary movement, shall have become engaged with the ten degree button 35, isolated by adjustment of the selector switch 57, within that segment of the monitor switch structure subtended by the segment selected by adjustment of the selector switch 59. Closure of the contacts of the relay CR–2 will permit the actuating coil of the relay CR–3 to become energized to operate its contacts for the control of the external relay circuits connected with said contacts, as soon as the arm 19, during its rotation, shall have engaged the two degree button 17, isolated by adjustment of the selector switch 55, within that segment of the monitor switch structure subtended by the ten degree button selected by adjustment of the selector switches 57 and 59.

It will be seen from the foregoing that the selector switches 55, 57 and 59 of each selector switch assembly 27 may be adjusted to isolate any desired one of the circle dividing buttons 17 and condition the system to actuate the relay switch CR–3 for the operation of the connected external relay circuitry at the precise instant when the arm in its rotary movement comes into engagement with the so isolated circle dividing button, that is to say, at an exactly predetermined moment during the cyclic operation or procedure being monitored. The automation switching system of the present invention may be applied usefully in connection with the operation of many and various kinds of cyclically operable apparatus, including material working presses of all kinds, machine tools, iron hand control mechanism, feed control apparatus, spray devices, any auxiliary device or facility needed to be actuated at a precise moment during the operating cycle of a cyclically operable machine, and any other equipment that requires a presettable or adjustable while in motion contact making device that may be set to operate at any desired angular position around a complete circle.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment for the purpose of illustrating the invention.

The invention is hereby claimed as follows:

1. Switching apparatus comprising a monitor switch forming a feedback station and having an energizing member and a contact support member, said members being adapted for relative rotation in synchronism with cyclically operable means to be monitored, a plurality of contact elements mounted on said support member, including a number of contact buttons circularly spaced upon said support member in position to successively make electrical connection with said energizing member as the members are relatively rotated, selector switch and associated relay means forming a command station adapted for electrical connection with the monitor switch, and a working device controlled by said relay means, said selector switch means being adjustable to select and isolate any desired one of said buttons to constitute the same as signal feedback means operable, when electrically connected with said energizing member, to deliver an actuating signal at said command station for the actuation of the working device by said relay means.

2. Switching apparatus as set forth in claim 1, wherein the buttons are interconnected together in sets for connection with the selector switch means, said selector switch means being operable to select and isolate the corresponding buttons of all sets in groups and to condition all of the buttons of a selected set for operation, so that only the isolated button of the conditioned set is made effective to deliver the actuating signal.

3. Switching apparatus as set forth in claim 1, wherein said working device comprises an electromagnetically operable load unit and said relay means comprises a cascade of relay circuits connected with the operable unit, and including switches operable successively in response to the successive engagement of said energizing member with selected contact elements of the monitor switch to successively condition said relay switches and said operable load unit for operation, the latter in response to engagement of the energizing member with the isolated contact button.

4. Switching apparatus as set forth in claim 1, wherein said contact elements include a plurality of grouping contacts circularly spaced in the monitor switch and each subtending an arcuate portion of the switch containing a plurality of said buttons forming a group of adjacently located buttons, said buttons being interconnected in button sets for connection with the selector switch means, each button set containing one button of each group, the selector switch means in conjunction with said grouping contacts serving to select and isolate any button group and to condition for operation the buttons of any selected button set, so that only the isolated button of the conditioned group is made effective to deliver the actuating signal.

5. Switching apparatus as set forth in claim 1, wherein said contact elements include a plurality of grouping contacts circularly spaced in the monitor switch and each subtending an arcuate portion of the switch containing a plurality of said buttons forming a group of adjacently located buttons, said buttons being interconnected in button sets for connection with the selector switch means, each button set containing one button of each group, said contact elements including a plurality of contact segments in end-to-end abutting relation and disposed circularly in said monitor switch, said segments each subtending an arcuate portion of the switch containing a plurality of said grouping contacts forming a contact group of adjacently disposed contacts and a corresponding plurality of said button groups, said grouping contacts being interconnected in contact sets for connection with the selector switch means, the selector switch means in conjunction with said segments and grouping contacts serving to select any of the button groups within the arcuate portion subtended by a segment and to isolate any one of the so selected button groups, said selector switch means, segment and contacts serving also to condition for operation the buttons of any selected button set, so that only the isolated button of the conditioned group is made effective to deliver the actuating signal.

6. Switching apparatus as set forth in claim 5, wherein three of the contact segments subtend arcs of the order of one hundred degrees each, while another segment subtends an arc of the order of sixty degrees, the switch having thirty-six grouping contacts, each subtending an arc of the order of ten degrees, and one hundred eighty contact buttons each subtending an arc of substantially two degrees.

7. Switching apparatus as set forth in claim 5, wherein said contact buttons are connected in sets to bus conductors, for connection with said selector switch means, said grouping contacts being connected with grouping conductors, for connection with said selector switch means, and said segments being connected each with a corresponding segment conductor, for connection with said selector switch means, said selector switch means including adjustable multiple position switch means connectible with said bus conductors, for selecting any desired one thereof for connection with said relay means, additional adjustable multiple position switch means connectible with said grouping conductors, for selecting any desired one thereof for connection with said relay means, and separate adjustable multiple position switch means connectible with said segment conductors for selecting any desired one thereof for connection with said relay means.

8. Switching apparatus as set forth in claim 5, wherein the contact buttons are connected in sets to ten bus conductors, the grouping contacts are connected with ten grouping conductors, and the segments are each connected to a corresponding segment conductor, said relay means comprising an initially operable relay switch having an energizing circuit and connected to control a relay circuit, a successively operable relay switch having an actuating coil connected in said relay circuit and a circuit controlling contactor, an operating circuit conditionable to energize the working device under the control of the contactor of said successively operable relay switch, said selector switch means including adjustable multiple position switch means connectible with said segment conductors for selecting any one of them for connection with said initially operable relay switch, additional adjustable multiple position switch means connectible with said grouping conductors for selecting any one of them for connection with said successively operable relay switch, and separate adjustable multiple position switch means connectible with said bus conductors for selecting any one of them for connection with said operating circuit.

9. Switching apparatus as set forth in claim 8, wherein three of the contact segments subtend arcs of the order of one hundred degrees, while a fourth segment subtends an arc of the order of sixty degrees, the monitor switch having thirty-six grouping contacts having angular spacement of the order of ten degrees, whereby the hundred degree segments each subtend ten contacts while the sixty degree segment subtends six contacts, the monitor switch having one hundred eighty contact buttons having angular spacement of the order of two degrees.

10. Switching apparatus as set forth in claim 6, wherein the selector switch means comprises an eight position rotary switch embodying a pair of wafers, a pair of ten position rotary switches respectively embodying a pair of wafers and three wafers, the diametrically opposite contacts of one wafer of the eight position switch being interconnected for connection respectively with the four segment conductors of the monitor switch, the diametrically opposite contacts of both wafers of the two wafer ten position switch being interconnected for connection respectively with the ten contact button sets, the corresponding contacts of a pair of wafers of the three wafer switch being electrically interconnected for connection with the ten grouping conductors of the monitor switch, the selector blades of the wafers of the two wafer ten position switch being respectively connected with alternate contacts of the remaining wafer of the three wafer switch, while the selector blades of the interconnected wafers of the three wafer switch are respectively connected with alternate contacts of the other wafer of the eight position switch, the relay means comprising an initially operating relay switch having an operating coil connected in circuit with the selector blade of the said one wafer of the eight position switch, a contactor controllingly connected in a subsequently operable circuit connected with the selector blade of said other wafer of the eight position switch, a subsequently operable relay switch having an actuating coil connected in said subsequently operable circuit and a contactor, and an operating circuit for energizing the working device to be controlled, said operating circuit being connected with the selector blade of the said remaining wafer of the three wafer switch and being conditionable to actuate the working device under the control of the said contactor of the subsequently operable relay switch.

References Cited by the Examiner

UNITED STATES PATENTS

| | | | |
|---|---|---|---|
| 2,326,930 | 8/1943 | Crowder | 307—141 |
| 2,385,840 | 10/1945 | Owens | 200—24 |
| 2,634,342 | 4/1953 | Baechler, et al. | 200—24 |
| 2,661,060 | 12/1953 | Otis | 307—141 |
| 2,700,076 | 1/1955 | Goode | 200—24 |

JOHN F. COUCH, *Primary Examiner.*

ORIS L. RADER, *Examiner.*

W. SHOOP, *Assistant Examiner.*